United States Patent [19]

Breck et al.

[11] Patent Number: 4,657,982

[45] Date of Patent: Apr. 14, 1987

[54] BLENDS OF POLYETHYLENE AND POLYBUTENES

[75] Inventors: Alan K. Breck; Alistair N. Mollison, both of Kingston, Canada

[73] Assignee: Du Pont Canada Inc., Mississauga, Canada

[21] Appl. No.: 565,774

[22] Filed: Dec. 27, 1983

[30] Foreign Application Priority Data

Jan. 4, 1983 [GB] United Kingdom ................ 8300074

[51] Int. Cl.$^4$ ...................... C08L 23/20; C08L 23/06; C08L 23/08
[52] U.S. Cl. .................................. 525/240; 525/222; 524/490; 524/528
[58] Field of Search ................................ 525/240, 222

[56] References Cited

U.S. PATENT DOCUMENTS 4,337,188  6/1982  Climenhage et al. ............... 524/140

FOREIGN PATENT DOCUMENTS 1106520  8/1981  Canada .
49-54472  5/1974  Japan .

Primary Examiner—Carman J. Seccuro

[57] ABSTRACT

Blends, and films made therefrom, are disclosed, such blends being made from 80–99 percent by weight of a polyethylene, 0.5 to 10.0 percent by weight of a polybutene having a number average molecular weight of from 500 to 1500 and 0.5 to 10.0 percent by weight of a polybutene having a number average molecular weight of from 1700 to 10 000. The films are useful in stretch wrapping applications.

2 Claims, No Drawings

BLENDS OF POLYETHYLENE AND POLYBUTENES

The present invention relates to polymer blends and self-sealing stretch wrapping films. In particular the invention relates to such films made from blends of polyethylenes and polybutenes.

Blends of polyethylenes and polybutenes are known. Self-sealing films made from blends of polyethylenes and polybutenes are also known.

West German Pat. No. 1 288 293 to BASF published 1969 Jan. 30 discloses a two step process for mixing polyethylene with a polyisobutylene having a molecular weight between 20,000 and 300,000. The method for determining molecular weight is not disclosed.

A bulletin, published about December 1970 by Amoco Chemicals Corporation, relating to Indopol TM polybutenes indicates that Indopol H-100 polybutene is compatible or partially compatible in concentrations of 10% and 50% in certain polyethylenes manufactured by Allied Chemical Corporation or Union Carbide Corporation. It is further indicated that the U.S. Food and Drug Administration had approved the use of Indopol polybutenes as additives in polyethylene film for food packaging applications in accordance with FDA Regulation 121.2610.

U.S. FDA Regulation 21 CFR 121.2610 revised as of 1976 Apr. 1 permitted the presence of isobutylene-butene copolymers, of average molecular weight in the range of 300–5000, as a plasticizer in polyethylene. Average molecular weight is determined by the procedure of ASTM-D2503.

U.S. Pat. No. 3,821,332 to E. Solop, which issued June 28, 1974 disclosed blending 70–85 percent by weight of polyethylene having a molecular weight between 250,000 and 1,500,000 with 30–15 percent by weight of polyisobutylene having an average Staudinger moleculAr weight of 80,000 to 120,000. Such blends are disclosed as being useful for a variety of end uses e.g. blow moulded and injection moulded parts, and film. Films made therefrom are described as being clear, tough and strong. U.S. Pat. No. 4,022,850, to Booth et al, which issued 1977 May 10, discloses a transparent self-sealing film made from a composition comprising 90–99.95 percent by weight of a copolymer of ethylene and a vinyl ester of a $C_2$–$C_{30}$ monocarboxylic acid containing at least 89 percent by weight of ethylene, and 0.05 to 10 percent by weight of a liquid polyisobutylene or polybutylene. A preferred ester is vinyl acetate and the copolymer made therewith has a melt index of 0.2 to 20. The liquid polyisobutylene or polybutylene preferably has a viscosity average molecular weight (Flory method) of 30,000 to 50,000.

West German Pat. No. 2 821 733 A49, to British Cellophane Limited, published Nov. 30, 1978 discloses a method of manufacturing a wrapping film suitable for use in spin wrapping applications, comprising extruding a blend of polyethylene and 0.5 to 10 percent by weight of polyisobutylene to form a film, and treating one surface of the film with corona discharge. Low density polyethylenes are exemplified, but the required molecular weight of the polyisobutylene is not indicated or suggested.

Canadian Pat. No. 1 106 520, to Doomernik et al., which isssued 1981 Aug. 04, discloses a blend, and a self-sealing stretch wrapping film made therefrom, of 90–98 percent by weight of polyethylene or ethylene/-vinyl acetate (EVA) copolymer having a melt index of 0.3 to 7.0 and a density of 0.917 to 0.933 g/cm$^3$, and 10 to 2 percent by weight of polybutene having a molecular weight of 700 to 2000. The method of determining molecular weight is not disclosed. One of the polybutenes disclosed is derived from isobutene. Said Canadian patent refers to Japanese pre-published application No. 49-54472, published May 27, 1974 in which there is proposed a film, suitable for stretch wrapping food products, made from EVA copolymer, containing not less than 70 percent ethylene, or from low density polyethylene, modified with a mixture of polybutenes having molecular weights in the ranges of 1100–1500 and 100–500.

With respect to molecular weight determination of polymers, solution viscosity methods for determining molecular weight e.g. Staudinger and Flory methods, relate to weight average molecular weight (Mw), and are used generally for determining weight average molecular weights of about 30,000 and above. Osmometric methods for determining molecular weight relate to number average molecular weight (Mn) and are generally used for determining number average molecular weights of 20,000 and below. Molecular weights referred to herein, unless otherwise specified, are number average molecular weights determined using ASTM Procedure D-2503-67.

A blend of polyethylene and two polybutenes, from which a film exhibiting better stretch-cling properties than film from prior art blends containing the same concentration of a single polybutene, has now been found.

Accordingly, the present invention provides a blend comprising 80 to 99% by weight of polyethylene, 0.5 to 10.0 percent by weight of a polybutene having a number average molecular weight of from 500 to 1500 and 0.5 to 10.0 percent by weight of a polybutene having a number average molecular weight of from 1700 to 10,000.

In a preferred embodiment one of the polybutenes has a number average molecular weight of from 700 to 1400, and especially from 900 to 1300.

In another embodiment one of the polybutenes has a number average molecular weight of from 1800 to 5000 and especially from 2100 to 3000.

In yet another embodiment the blend has from 2 to 12 percent by weight of the polybutenes, especially from 3 to 10 percent by weight of the polybutenes. Preferably the higher molecular weight polybutene is at a concentration about the same as or more than that of the lower molecular weight polybutene. More preferably the blend contains from 1 to 5 percent by weight of each of the polybutenes.

In a further embodiment the polyethylene comprises 70–100 percent by weight of a linear ethylene/$C_4$ to $C_8$-$\alpha$-olefin copolymer and 30 to 0 percent by weight of a polymer selected from high pressure polyethylenes, ethylene/vinyl acetate copolymers and mixtures thereof. Preferably the olefin copolymer has a density from 0.916 to 0.930 g/cm$^3$, and more preferably from 0.916 to 0.925 g/cm$^3$.

The term "polybutene", as used herein in relation to the present invention, refers to polymers having a backbone predominantly based on n-butene or isobutylene. Polybutenes known in the trade as polyisobutylenes may be made by catalytically polymerizing an isobutylene-rich butene mixture, with more 1- and 2-butenes being incorporated in the lower molecular weight polyisobutylenes than in the higher molecular weight polyisobutylenes. Polybutenes may also be synthesized, by a low temperature catalytic process, from a refinery gas stream containing polymerizable olefins, particularly isobutylene.

The present invention also provides film made from blends of the present invention. In a preferred embodiment such films have a thickness of from 12 to 76 μm, especially from 20 to 50 μm.

The constituents of the composition of the invention may be preblended using a high shear mixer e.g. a twin screw extruder. The blend may be directly extruded into film form using the flat film or blown film methods. Alternatively the preblend may be extruded into pellets and stored before further extrusion, at an appropriate time and place, into film form.

A concentrate of 10 to 40 percent by weight of the combined polybutenes in a polyethylene may also be prepared in pellet form, prior to blending with the same or a different polyethylene or with an EVA copolymer, in order to lower the concentration of polybutenes in the final mixture. Blending of the concentrate and the additional polymer may be accomplished using the known "salt and pepper" blending technique prior to extrusion, or by known melt blending techniques in an extruder.

The blown film method is the preferred method for forming the film of the present invention. In the blown film method the polyethylene/polybutene blend of the present invention is extruded through a circular die. The resulting tubular film is pulled from the die by cooperating nip rollers which collapse the tubular film at the nip. The tubular film, between the circular die and the nip rollers is sometimes referred to as a bubble. While in the molten or plastic formative state the tubular film is expanded by air or inert gas admitted into the bubble through the die land in the centre of the circular die.

The tubular film, which is expanded by introduction of air into the bubble, may be cooled by directing air onto the exterior of the film while in the plastic formative state. The film is cooled until it is in the solid state. Cooling to the solid state is often referred to as quenching. It has been found that the faster the film is quenched the higher the cling level of the film. Faster quenching, in the blown film method, may be accomplished by passing the expanding film about a cooled mandrel which is situated within the bubble. One such method, using a cooled mandrel, is disclosed in Canadian Patent 893 216 which issued Feb. 15, 1972 to M. Bunga and C. V. Thomas.

It has been found that use of the two polybutenes, of differing number average molecular weights, gives a film which not only has cling levels higher than that obtained by using a single polybutene but which produces a film in which cling blooms more quickly.

The method for measuring cling is as follows:

The composition, for which cling is to be determined, is first formed into film having a thickness of from 12 to 38 μm. Test results herein are shown for films made by a blown film method, such films having a thickness of 15 or 25 μm. Strips of the film, 25.4 mm in width, are then cut from the film under study. Pairs of like strips are taken and are placed in face to face contact such that 25.4 mm of their lengths overlap. The overlapping area is subjected to a pressure of 6.89 kPa for a period of one minute. The pair of strips are then mounted in an Instron ™ testing machine and pulled apart at a rate of 12.27 mm/min. The cling value is the maximum force, in Newtons per centimeter width of film, required to pull the strips apart in a shearing mode.

It is to be understood that the blends and films of the present invention may contain ultra-violet light stabilizers, pigments, antioxidants and other modifiers known in the art.

The following examples illustrate the invention.

EXAMPLE 1

This example demonstrates the apparently synergistic effect of using a combination of two polybutenes when compared to using the same concentrations of the two polybutenes when used separately.

In test No. 1, five parts by weight of a polybutene having a Mn of 920, blended with 95 parts by weight of a linear ethylene/butene-1 copolymer having a density of 0.919 g/cm$^3$ and a melt index of 0.6 g/10 min., was extruded into film form using a blown film method. The film was 25 μm in thickness.

In test No. 2, the polybutene of test No. 1 was replaced by 5 parts by weight of a polybutene having an Mn of 2300.

In test No. 3, 2.5 parts by weight of a polybutene having an Mn of 920 blended with 97.5 parts by weight of the linear ethylene/butene-1 copolymer of test No. 1, was extruded into film form using a blown film method. The film was 25 μm in thickness.

In test No. 4, the polybutene of test No. 3 was replaced by a polybutene having an Mn of 2300.

In test No. 5, the polybutene of test No. 1 was replaced by 1.8 parts by weight of a polybutene having an Mn of 920 and 3.2 parts by weight of a polybutene having an Mn of 2300.

In test No. 6, the polybutene of test No. 5 having the Mn of 920 was replaced by a polybutene having an Mn of 1290.

Tests 1, 2, 3 and 4 are outside the scope of the present invention while tests 5 and 6 fall within the scope of the present invention.

Cling levels for all films were determined 24 hours and 48 hours after extrusion into film form. Table I summarizes the results obtained.

TABLE I

| Test | Parts(PB)* | Mn | Cling(N/cm) 24 h | Cling(N/cm) 48 h |
|---|---|---|---|---|
| 1 | 5 | 920 | 3.05 | 3.75 |
| 2 | 5 | 2300 | 1.94 | 3.34 |
| 3 | 2.5 | 920 | 0.74 | 0.84 |
| 4 | 2.5 | 2300 | 0.19 | 0.28 |
| 5 | 1.8 | 920 | 4.08 | 5.24 |
|   | 3.2 | 2300 |   |   |
| 6 | 1.8 | 1290 | 4.78 | 4.82 |
|   | 3.2 | 2300 |   |   |

*PB = polybutene

EXAMPLE II

A number of compositions coming within the scope of the present invention were extruded into film form using the blown film method. Cling levels of the films, each having a thickness of 25 μm, were measured 24 and 48 hours after extrusion into film. The polyethylene of the composition was a linear low density polyethylene having a of 0.919 g/cm$^3$ and a melt index of 0.6 g/10 min. The results are shown in Table II.

TABLE II

| | PB* | | Cling(N/cm) | |
|---|---|---|---|---|
| | Parts | Mn | 24 h | 48 h |
| Film A | 2.0 | 920 | 3.28 | 4.08 |
| | 3.0 | 2300 | | |
| Film B | 2.5 | 920 | 3.66 | 4.20 |
| | 2.5 | 2300 | | |
| Film C | 2.0 | 920 | 1.52 | 4.97 |
| | 4.0 | 2300 | | |
| Film D | 2.5 | 1290 | 4.61 | 4.71 |
| | 2.5 | 2300 | | |
| Film E | 2.0 | 1290 | 4.99 | 3.96 |
| | 4.0 | 2300 | | |

*PB = polybutene

EXAMPLE III

A further composition falling within the scope of the invention, was extruded into film form using a blown film method. The polyethylene of the composition comprised a blend of 85 parts by weight of a linear polyethylene having a density of 0.919 g/cm$^3$ and a melt index of 0.6 g/10 min, and 15 parts by weight of a high pressure polyethylene having a density of 0.917 g/cm$^3$, and a melt index of 6.5 g/10 min.

The film was 25 μm thick and had the following cling level several days after production.

| Parts(PB)* | Mn | Cling(N/cm) |
|---|---|---|
| 1.6 | 1290 | 4.17 |
| 2.9 | 2300 | |

*PB = polybutene

We claim:
1. A blend comprising (a) 80 to 99% by weight of a polyethylene, in which the polyethylene is 70 to 100 wt. % of a linear ethylene-C$_4$ to C$_8$-α-olefin copolymer and 30 to 0 wt. % of a polymer selected from high pressure polyethylenes and ethylene/vinyl acetate copolymers and mixtures thereof, (b) 0.5 to 10.0% by weight of a polybutene having a number average molecular weight of from 500 to 1500 and (c) 0.5 to 10% by weight of a polybutene having a number average molecular weight of from 1700 to 10,000.
2. A film, having a thickness of from 12 to 76 μm, made from the blend of claim 1.

* * * * *